US010506468B2

(12) United States Patent
Nammi et al.

(10) Patent No.: US 10,506,468 B2
(45) Date of Patent: Dec. 10, 2019

(54) REPORTING HYBRID AUTOMATIC REPEAT REQUEST-ACKNOWLEDGEMENTS IN WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 75 days.

(21) Appl. No.: 15/699,246

(22) Filed: Sep. 8, 2017

(65) Prior Publication Data

US 2019/0082351 A1    Mar. 14, 2019

(51) Int. Cl.
| | | |
|---|---|---|
| *H04W 4/00* | (2018.01) | |
| *H04W 28/04* | (2009.01) | |
| *H04L 1/00* | (2006.01) | |
| *H04L 1/18* | (2006.01) | |
| *H04L 1/16* | (2006.01) | |

(52) U.S. Cl.
CPC ........... *H04W 28/04* (2013.01); *H04L 1/0071* (2013.01); *H04L 1/1607* (2013.01); *H04L 1/1812* (2013.01); *H04L 1/1832* (2013.01); *H04L 1/1858* (2013.01)

(58) Field of Classification Search
CPC .... H04W 28/04; H04L 1/1858; H04L 1/1832; H04L 1/1812; H04L 1/0071
See application file for complete search history.

(56) References Cited

U.S. PATENT DOCUMENTS

| | | |
|---|---|---|
| 8,132,069 B2 | 3/2012 | Park et al. |
| 8,264,992 B2 | 9/2012 | Earnshaw et al. |
| 8,320,341 B2 | 11/2012 | Malkamaki et al. |
| 8,370,695 B2 | 2/2013 | Hsu |
| 8,670,379 B2 | 3/2014 | Yamada et al. |
| 8,781,035 B2 | 7/2014 | Cheng et al. |
| 8,885,479 B2 | 11/2014 | Damnjanovic et al. |
| 9,014,130 B2 | 4/2015 | Lee et al. |
| 9,137,787 B2 | 9/2015 | Larsson et al. |

(Continued)

FOREIGN PATENT DOCUMENTS

| | | |
|---|---|---|
| DE | 101 58 755 A1 | 6/2003 |
| WO | 2016122390 A2 | 10/2016 |

(Continued)

OTHER PUBLICATIONS

Zaidi, et al., "Designing for the future: The 5G NR Physical Layer," Ericsson Technology Review, Jun. 27, 2017, 14 pages.

(Continued)

*Primary Examiner* — Clemence S Han
(74) *Attorney, Agent, or Firm* — Amin, Turocy & Watson, LLP

(57) ABSTRACT

The described technology is generally directed towards a composite HARQ-ACK response that contains information corresponding to a current HARQ-ACK composed with one or more previous HARQ-ACKs in a single uplink transmission. As a result, even with a HARQ-ACK repetition factor greater than one, the network is able to schedule the user equipment in consecutive time intervals as if the repetition factor was one (that is, as if no repetition).

20 Claims, 14 Drawing Sheets

(56) References Cited

U.S. PATENT DOCUMENTS

| | | |
|---|---|---|
| 9,148,211 B2 | 9/2015 | Chu |
| 9,363,047 B2 | 6/2016 | Cheng et al. |
| 9,391,736 B2 | 7/2016 | Nayeb et al. |
| 9,473,267 B2 | 10/2016 | Hwang et al. |
| 9,554,297 B2 | 1/2017 | Han et al. |
| 9,615,329 B2 | 4/2017 | Tabet et al. |
| 9,654,265 B2 | 5/2017 | Chen et al. |
| 9,674,766 B2 | 6/2017 | Braithwaite |
| 9,749,096 B2 | 8/2017 | Lidian et al. |
| 9,762,356 B2 | 9/2017 | Rudolf et al. |
| 2007/0245201 A1 | 10/2007 | Sammour et al. |
| 2008/0046793 A1* | 2/2008 | Heo ............... H04L 1/1607 714/748 |
| 2011/0085511 A1* | 4/2011 | Fan ................ H04L 1/0031 370/329 |
| 2013/0148592 A1* | 6/2013 | Noh ............... H04W 72/12 370/329 |
| 2014/0092786 A1* | 4/2014 | He ................. H04W 4/70 370/280 |
| 2014/0286255 A1 | 9/2014 | Nam et al. |
| 2016/0337157 A1 | 11/2016 | Papasakellariou |
| 2017/0086170 A1* | 3/2017 | Takeda ............ H04L 5/1415 |
| 2017/0170931 A1* | 6/2017 | Kusashima ...... H04W 72/04 |
| 2017/0238333 A1* | 8/2017 | Ling .............. H04L 1/1812 370/329 |
| 2017/0373801 A1* | 12/2017 | Bergstrom ....... H04L 1/1812 |

FOREIGN PATENT DOCUMENTS

| | | |
|---|---|---|
| WO | 2016204811 A1 | 12/2016 |
| WO | 2017019132 A1 | 2/2017 |
| WO | 2017121708 A1 | 7/2017 |
| WO | 2017155594 A1 | 9/2017 |

OTHER PUBLICATIONS

Lakshmana, et al.,"Frequency Allocation in Non-Coherent Joint Transmission CoMP Networks," © 2014 IEEE, 7 pages.

Sekhar, "HARQ in TDLTE," Jul. 6, 2012, 4 pages.

International Search Report and Written Opinion for International Application Serial No. PCT/US2018/050100 dated Dec. 20, 2018, 13 pages.

* cited by examiner

US 10,506,468 B2

REPORTING HYBRID AUTOMATIC REPEAT REQUEST-ACKNOWLEDGEMENTS IN WIRELESS COMMUNICATION SYSTEMS

TECHNICAL FIELD

The subject application is related to wireless communication systems, and, for example, to reporting hybrid automatic repeat request acknowledgements in a wireless communication system.

BACKGROUND

In wireless communication systems, based on pilot or reference signals, user equipment computes channel estimates, and computes the parameters needed for channel state information (CSI) reporting. A CSI report is sent from the user equipment to a network device via a feedback channel on request from the network, or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

When user equipment receives a packet, the user equipment returns a Hybrid Automatic Repeat reQuest-ACKnowledgement (HARQ-ACK) on the physical uplink control channel (PUCCH) to the network device/gNodeB. The gNodeB needs to correctly decode the HARQ-ACK from the PUCCH information to know whether the packet it transmitted was received correctly or not. Once the gNodeB decodes the PUCCH information, the gNodeB determines whether to retransmit the packet (if NAK) or pass it to upper layers (if ACK).

However, the PUCCH transmissions from multiple sets of user equipment increase the uplink interference level (or more specifically rise over thermal (RoT)) received in uplink at the gNode B. This is because in uplink, each user equipment transmits on the same resources; (users are separated by non-orthogonal scrambling codes also referred to as Constant Amplitude Zero AutoCorrelation waveform or CAZAC sequences). Therefore uplink transmissions have to share interference-limited radio resources.

One way to improve PUCCH performance and thereby improve the PUCCH coverage is to repeat the HARQ-ACK transmission for each received packet. This is accomplished by the use of a HARQ-ACK repetition factor, which describes how many times the user equipment is to transmit the (same) HARQ-ACK message associated with a transport block. However when the HARQ-ACK is repeated the network cannot schedule the user equipment in consecutive time intervals, because the user equipment will be transmitting the repeated HARQ-ACK during this next time interval; as a result, peak throughput is reduced.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
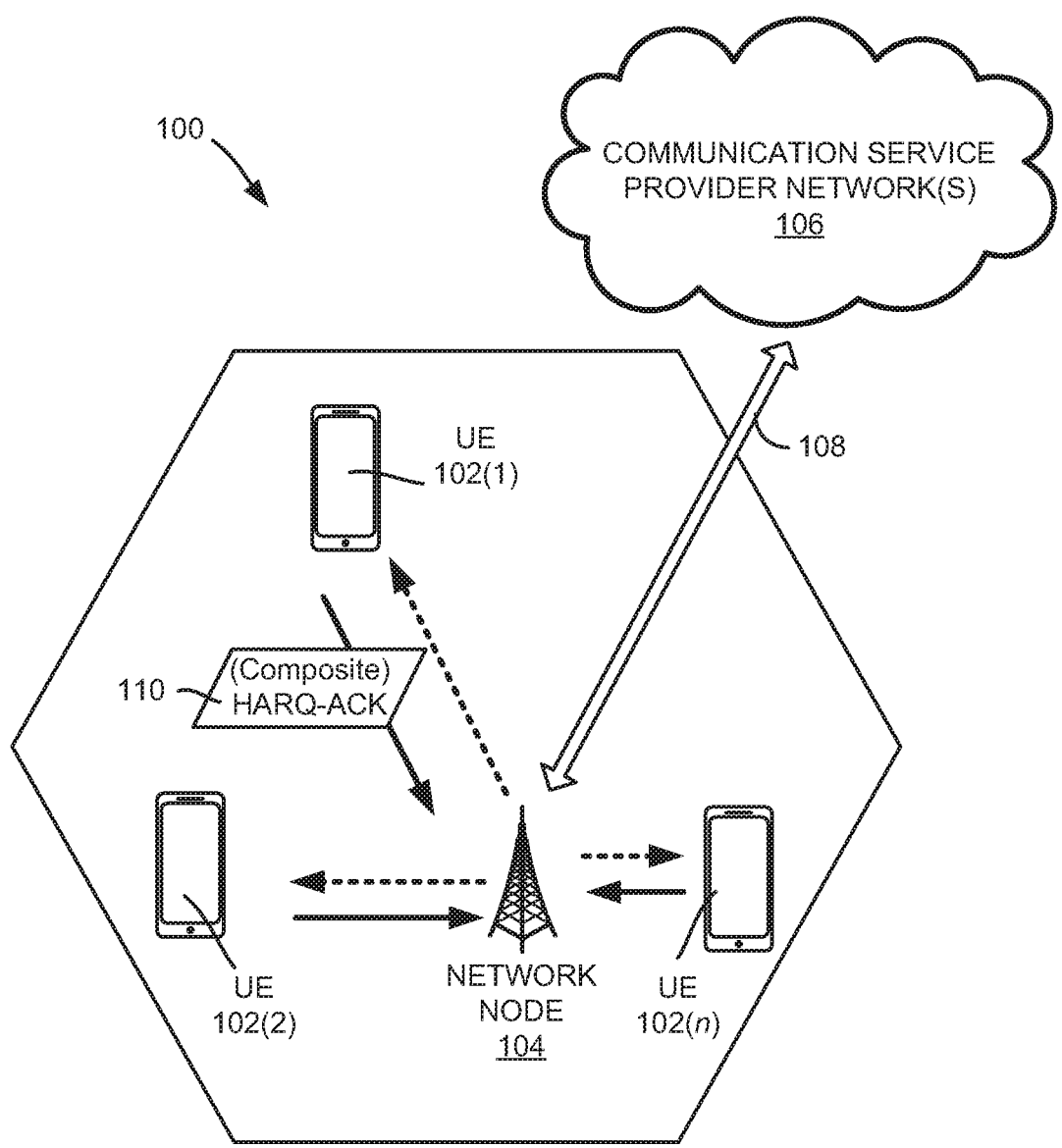
FIG. 1 illustrates an example wireless communication system in which a network node device (e.g., network node) and user equipment (UE) can implement various aspects and implementations of the subject disclosure.

Briefly, one or more aspects of the technology described herein are generally directed towards the concept of a composite HARQ-ACK response that contains information corresponding to a current HARQ-ACK composed with one or more previous HARQ-ACKs in a single uplink transmission. As a result, even with a HARQ-ACK repetition factor greater than one, the network is able to schedule the user equipment in consecutive time intervals as if the repetition factor was one (that is, as if no repetition).

By way of example, consider that the repetition factor is two. A composite HARQ-ACK for a current packet is composed to contain the HARQ-ACK data for the current packet, plus the repeated HARQ-ACK data for the previous packet. When received at the network device, the network device decomposes (or otherwise determines) from the composite HARQ-ACK the first HARQ-ACK of the (to-be-repeated HARQ-ACKs) for the current packet just sent, as well as the repeated HARQ-ACK of the previous packet. As more packets are sent, as can be understood, this composite HARQ-ACK technology provides a moving window of HARQ-ACK data that represents the current HARQ-ACK information set for the current packet and repeated HARQ-ACK information set(s) for previous packet(s).

In one or more aspects, the composing may be accomplished by multiplexing (e.g., interleaving) the HARQ-ACK information sets corresponding to the current packet and previous packets, with the number of previous packets for which HARQ-ACK data is selected based on the repetition factor. In one or more aspects, the composing may be accomplished by bundling (which may be "AND-ing") the ACK or NACK of the HARQ-ACK information sets corresponding to the current packet and previous packet(s).

In general, described herein is reporting HARQ-ACK information when the network configures the user equipment to repeat the HARQ-ACK information. With composite HARQ-ACK information, the benefits of repetition of HARQ-ACK are obtained, while at the same time the network can schedule the user equipment consecutively as if the repetition factor is equal to 1 (normal operation).

In general the user equipment determines the HARQ-ACK for a PDSCH for transmission to a network node, obtains or determines based on one or more criteria a first repetition factor for transmitting HARQP-ACK information to the network node, and transmits to the first or a second network node HARQ-ACK information comprising number of the repeated transmissions of the same content of the first type of information.

The first network node or in a second network node configure a user equipment to transmit first uplink feedback information to the network node and detect the HARQ-ACK information from the network node and determine whether the scheduled packet is passed or not at the network node.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

One example scenario comprises of a user equipment served by a first cell, which in turn is served by a first network node. The user equipment may be configured by the first network node to obtain or determine HARQ ACK/NACK. The user equipment may further be configured to obtain and transmit second uplink feedback information to the second network node. The UE may even be configured to obtain and transmit plural types of uplink feedback information to the second network node. The user equipment further may be configured by the network node with at least a first repetition factor (K1) based on one or more criterion, e.g., the location of the user equipment relative to the cell, such as whether the user equipment is at the cell edge or when the path loss is very high or received signal to noise ratio is very low. The value of K1 is to be used by the UE for repeating the same content of HARQ-ACK either implicitly or explicitly and transmitting repeated content to the second network node.

The repetition of the same uplink feedback signal enhances the reliability of the reception of the feedback at the network node. The term 'repeated content' may also be interchangeably called as 'redundancy content'. The transmission of the repeated contents may be sent in the same message or transmission occasion or instances or over multiple messages or channel transmission occasions or instances.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to an improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to provide the network node with a single or composite HARQ-ACK response 110, for use in determining whether a packet was successfully received or needs to be transmitted. To this end, the user equipment transmits via the uplink control channel, which carries information about HARQ-ACK information corresponding to the downlink data transmission, and channel state information. As will be understood, the network node decomposes or otherwise evaluates the HARQ-ACK response 110 to make the determination regarding packet acknowledgement or negative acknowledgement.

Figure 2:
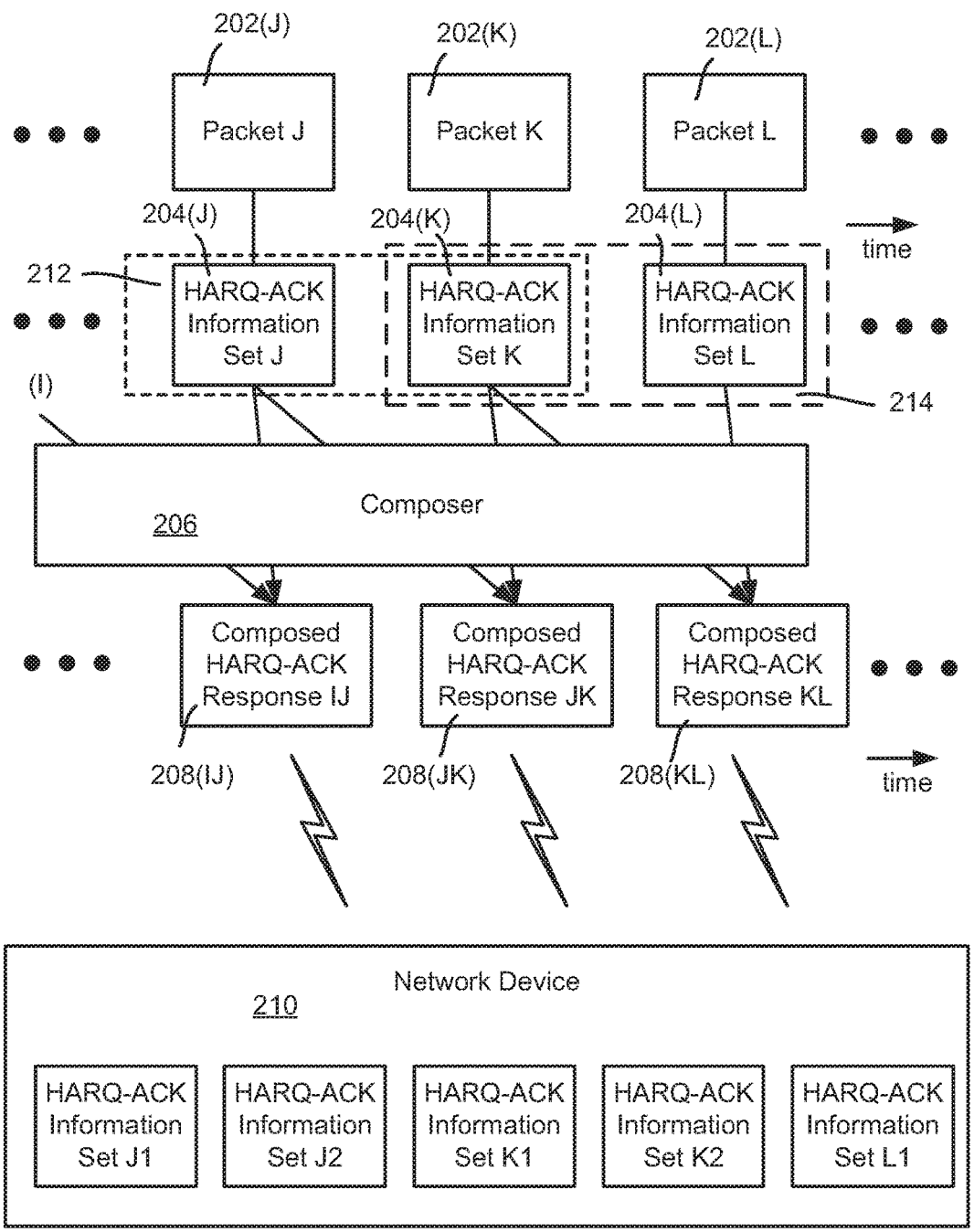
FIG. 2 illustrates a block diagram example of sending composed HARQ-ACK responses with the repetition factor of two, in accordance with various aspects and implementations of the subject disclosure.

As a more particular example, as represented in FIG. 2, consider that the repetition factor is two. Note that the value of the repetition factor may change over time based on current conditions, e.g., when the user equipment is close to the network transmitter the value may be one, whereas the value increases as the user equipment moves away from the network transmitter. The value may be computed based on a combination of various criteria, and may be determined by the network node and communicated to the user equipment, or may be determined by the user equipment and communicated to the network node. In any event, each participant obtains and knows the current value of the repetition factor. The uplink feedback information can reuse the legacy HARQ-ACK structure for the multi-codeword HARQ-ACK or in some instances, may reuse the same structure as that of single codeword.

As can be seen, instead of repeating the HARQ-ACK response two times for each packet 202(J)-202(L), only one composed HARQ-ACK response is sent per packet. To this end, the HARK-ACK information set 204(L) for the current packet, e.g., 202(L), is composed with the HARK-ACK information set 204(K) for the previous packet 202(K), and sent to the network device in a composed HARQ-ACK response 208(KL). The network device then decomposes the single composite response into individual HARQ-ACK information sets, which are each duplicated in this example.

In general, this may be conceptually thought of as a moving "window" of HARQ-ACK information sets. In FIG. 2, dashed boxes 212 and 214 represent such a window at different, consecutive HARQ-ACK response times.

Figure 3:
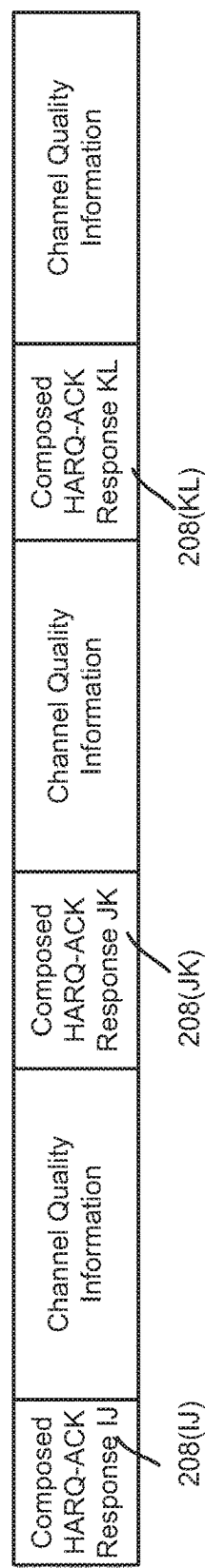
FIG. 3 illustrates a timeline example of sending composed HARQ-ACK responses with the repetition factor of two, in accordance with various aspects and implementations of the subject disclosure.

FIG. 3 shows a timeline example corresponding to some of the composed responses of FIG. 2, in which, for example, the HARQ-ACK response plus the channel quality information are transmitted every one millisecond. As can be seen, the composed HARQ-ACK response eliminates the need for multiple transmissions of the same information. Note that repeated packets as a result of a NACK are not explicitly represented in FIG. 2 or 3.

Figure 4:
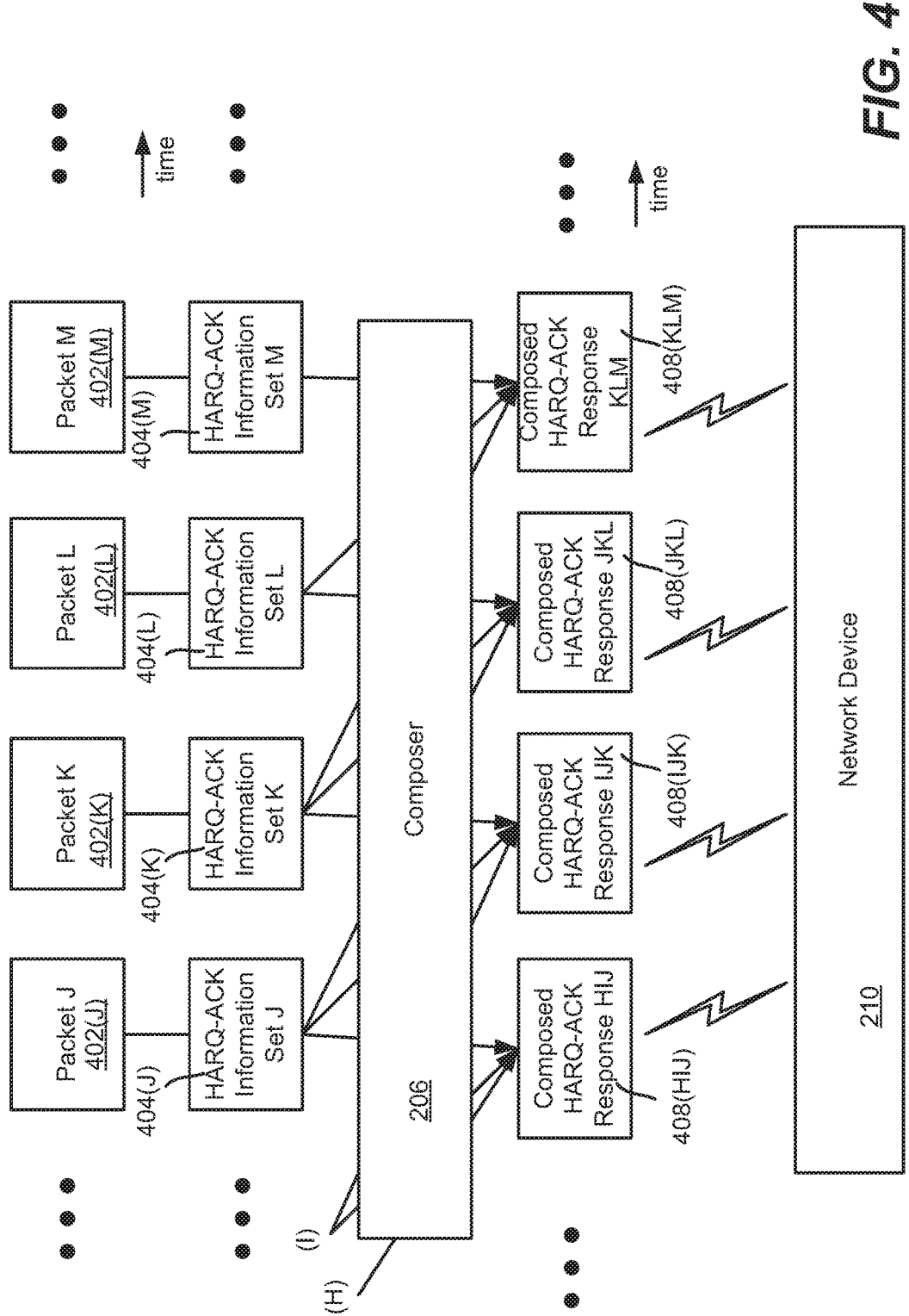
FIG. 4 illustrates a block diagram example of sending composed HARQ-ACK responses with the repetition factor of three, in accordance with various aspects and implementations of the subject disclosure.
Figure 5:
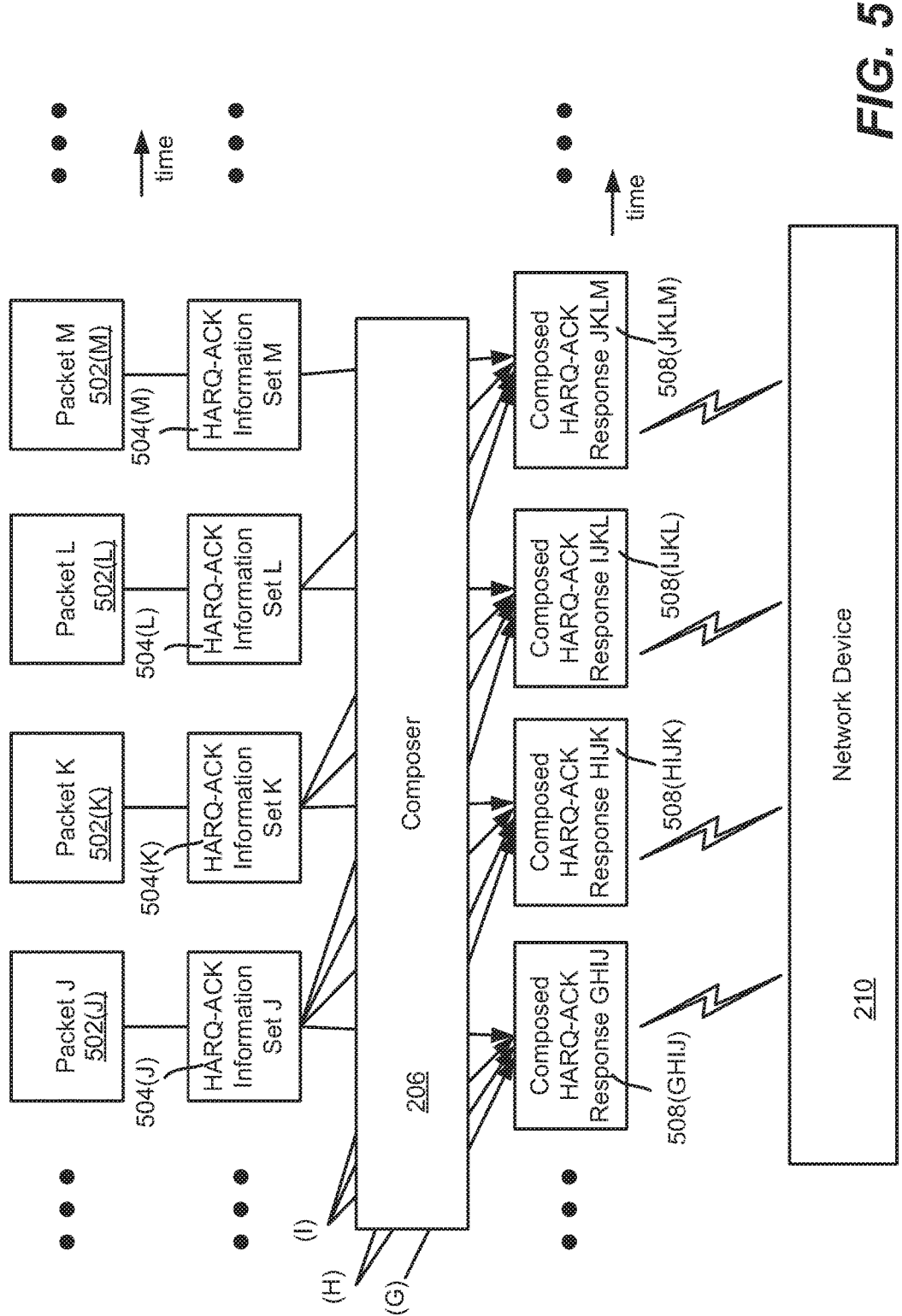
FIG. 5 illustrates a block diagram example of sending composed HARQ-ACK responses with the repetition factor of four, in accordance with various aspects and implementations of the subject disclosure.

FIGS. 4 and 5 show the composing of composite responses for a repetition factor of three and four, respectively. As can be seen, the "window" of HARQ-ACK information sets is based on the current HARQ-ACK data and the previous two HARQ-ACK information sets (FIG. 4, for a repetition factor of three) or previous three HARQ-ACK information sets (FIG. 5, for a repetition factor of four).

Figure 6:
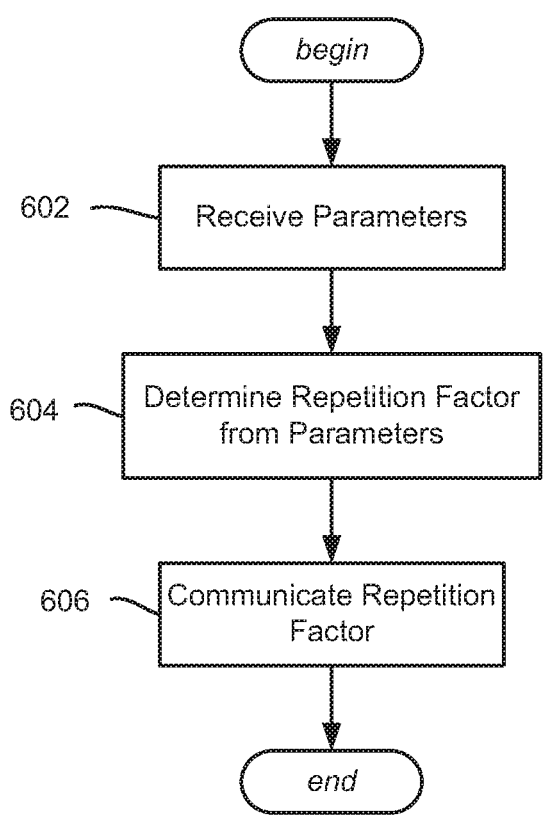
FIG. 6 illustrates an example flow diagram of operations for determining and communicating a repetition factor value, in accordance with various aspects and implementations of the subject disclosure.

As generally represented in the example operations of FIG. 6, exemplified as steps, step 602 represents receiving the parameters from which the repetition factor is determined at step 604. Step 606 communicates the repetition factor, that is, if the user equipment has determined the repetition factor via steps 602 and 604, the communication in step 606 is from the user equipment to the network device. If conversely the network device has determined the repetition factor via steps 602 and 604, the communication in step 606 is from the network device to the user equipment.

Figure 7:
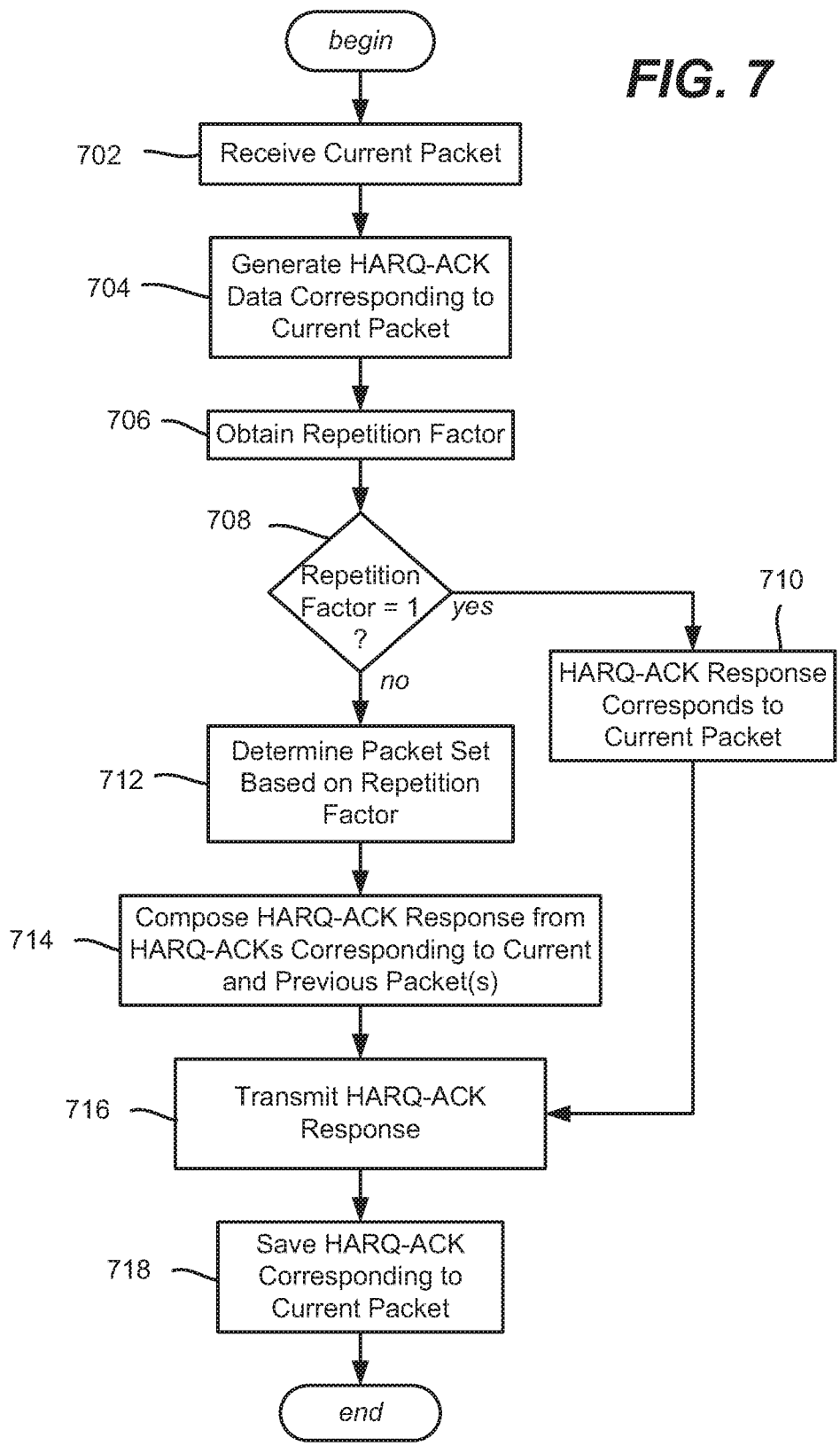
FIG. 7 illustrates an example flow diagram of user equipment operations for composing a composite HARQ-ACK response, in accordance with various aspects and implementations of the subject disclosure.

In the example operations of FIG. 7, the repetition factor is used to determine whether or not composing of the HARQ-ACK response is needed. Step 702 represents receiving a current packet, and step 704 represents generating the HARQ-ACK data corresponding to this current packet. Step 706 represents obtaining the repetition factor, e.g., from a suitable storage on the user equipment.

If at step 708 the repetition factor is one, no composing needs to be performed and thus the HARQ-ACK response corresponds to the current packet, that is, the HARQ-ACK data generated at step 704. This response is transmitted at step 716, with the HARQ-ACK data saved at step 718 in case the repetition factor changes and the data is needed for composing a subsequent HARQ-ACK response.

If instead at step 708 the repetition factor was not equal to one, e.g., the repetition factor is two, three or four, a packet set is determined based on the repetition factor. As is understood if the repetition factor is two, the packet set comprises the current packet and the previous packet. If the repetition factor is three, the packet set comprises the current packet, the previous packet, and the next most recent previous packet, and so on.

The HARQ-ACKs corresponding to the current packet and the rest of the packets of the packet set are then composed into a single, composite HARQ-ACK response at step 714. Step 716 represents transmitting the composite HARQ-ACK response to the network device. Step 718 saves the HARQ-ACK data of the current packet for use in subsequent composite responses (if needed).

Turning to aspects related to the composing of the HARQ-ACK information, one type of composing comprises multiplexing, while another comprises bundling. With respect to multiplexing the HARQ-ACK information multiple time intervals, the user equipment multiplexes the HARQ-ACK information from multiple time intervals so that the network node can schedule the user equipment without any interruption. For example, consider that the repetition factor is two and that the network node schedules the equipment with a first physical downlink shared channel (PDSCH) at time T1 and second PDSCH at time T2 and third PDSCH at time T3. Then the user equipment reports the HARQ-ACK corresponding to the first PDSCH at reporting interval T4, the HARQ-ACK corresponding to the first PDSCH and second PDSCH at reporting interval T5, the HARQ-ACK corresponding to the second PDSCH and third PDSCH at time interval T5 and so on. Note that in this scheme with a repetition factor of two the user equipment may interlace the HARQ-ACK information corresponding to two different instances.

For example, consider that the HARQ-ACK codebook is defined with a length 12 sequence and let N be the cardinality or the size of the codebook. Then in the conventional method (repetition factor equal one) the HARQ-ACK data is represented by:

| HARQ-ACK | Sequence |
| --- | --- |
| 0 (NAK) | Sequence 1 |
| 1(ACK) | Sequence 30 |

The sequence transmission using a multiplexing technique provides an interlaced HARQ-ACK data with multiplexed from two time intervals:

| HARQ-ACK | HARQ-ACK | Sequence |
| --- | --- | --- |
| 0 (NAK) | 0(NAK) | Sequence 2 |
| 1(ACK) | 0(NAK) | Sequence 29 |
| 0 (NAK) | 1(ACK) | Sequence 12 |
| 1(ACK) | 1(ACK) | Sequence 20 |

The same principle may be extended to any practical number of multiple time intervals.

An alternative implementation provides for the user equipment bundling the HARQ-ACK information from multiple time intervals, again so that the network node can schedule the user equipment without any interruption. For example, with a repetition factor of two, the network node schedules the user equipment with first PDSCH at time T1 and second PDSCH at time T2 and third PDSCH at time T3. Then the UE reports the HARQ-ACK response corresponding to the first PDSCH at reporting interval T4, and the bundled HARQ-ACK corresponding to the first PDSCH and second PDSCH at reporting interval T5, where the bundling over two time intervals is defined as in the following table:

| HARQ-ACK 1 | HARQ-ACK 2 | Bundled HARQ-ACK |
| --- | --- | --- |
| 0 (NAK) | 0(NAK) | 0(NAK) |
| 1(ACK) | 0(NAK) | 0(NAK) |
| 0 (NAK) | 1(ACK) | 0(NAK) |
| 1(ACK) | 1(ACK) | 1(ACK) |

Note that with bundling, an ACK is transmitted only when the HARQ-ACK for the two PDSCHs are each an ACK. Basically, the operation is a logical "AND" with an ACK corresponding to one (1). The same principle can be extended over multiple time intervals. Once the bundled HARQ-ACK is determined the two sequences can be used to transmit the bundled HARQ-ACK as in Table 4:

| Bundled HARQ-ACK | Sequence |
|---|---|
| 0 (NAK) | Sequence 1 |
| 1 (ACK) | Sequence 30 |

Figure 8:
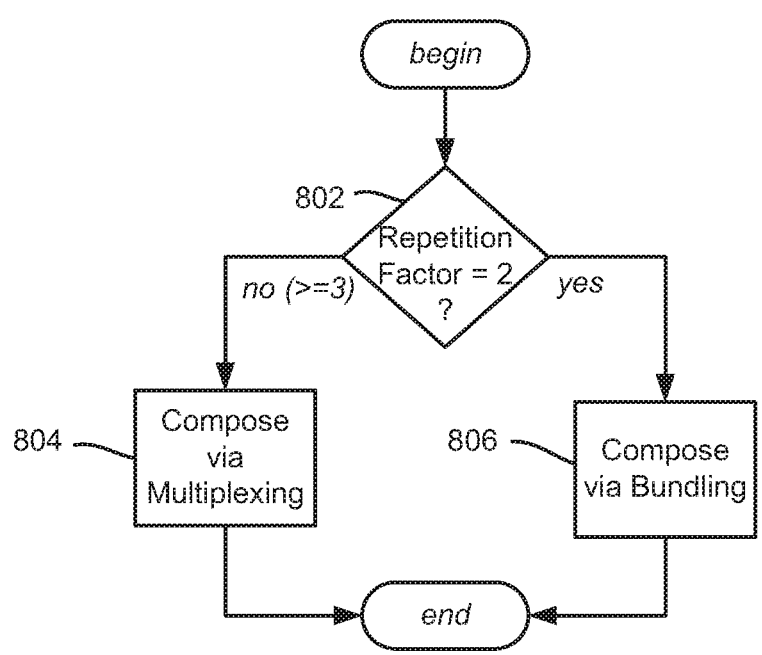
FIG. 8 illustrates an example flow diagram of user equipment operations for selecting multiplexing or bundling for composing a composite HARQ-ACK response, in accordance with various aspects and implementations of the subject disclosure.

Note that in the bundling alternative, the ACK/NACK information for an individual packet may be lost, e.g., when the repetition factor is greater than two. Unlike multiplexing, in which the network device can demultiplex the individual responses, with bundling, multiple packets may need to be transmitted even though only one may have a NACK. FIG. 8 represents a combined solution in which the repetition factor is evaluated at step 802 so that composing may be by multiplexing (step 804) if the repetition factor is three or more, or by bundling (step 806) if the repetition factor equals two.

Figure 9:
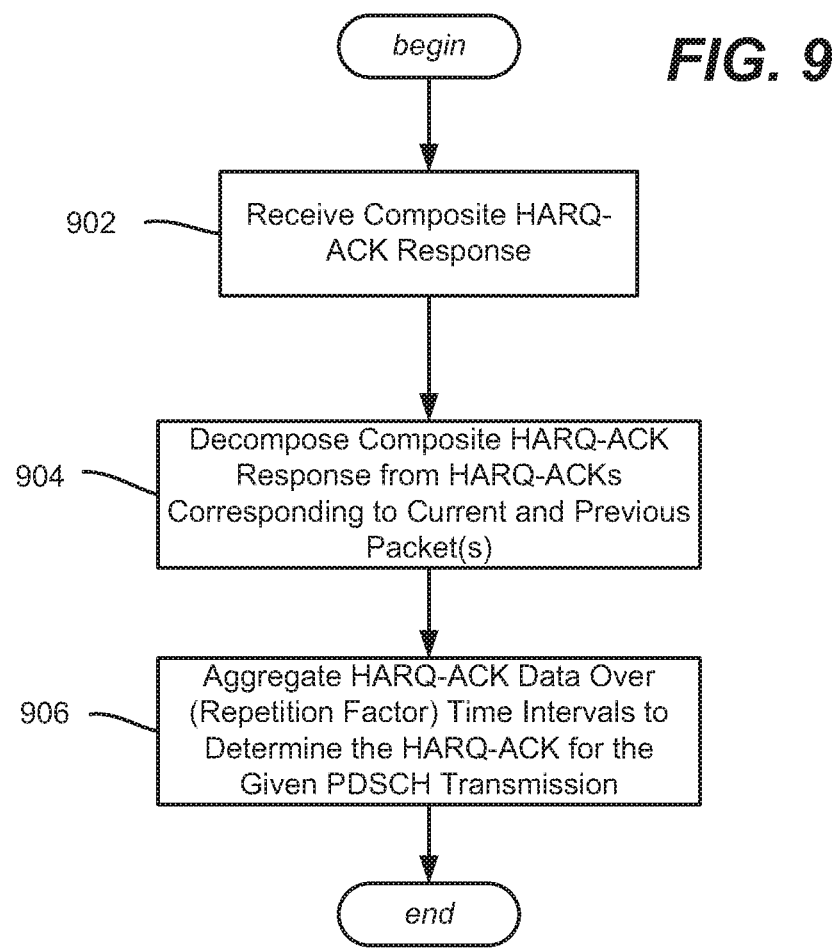
FIG. 9 illustrates an example flow diagram of network node operations for decomposing and using a composite HARQ-ACK response, in accordance with various aspects and implementations of the subject disclosure.

As represented in FIG. 9, once the network node receives the sequences (step 902), the network node needs to decompose (step 904) the composite response into individual packet-related responses. At step 906 the network node aggregates the received sequences over K1 time intervals (where K1 corresponds to the repetition factor) to determine the HARQ-ACK for the given PDSCH transmission. Note that the operations of FIG. 9 also may use logic similar to that of FIG. 8 if a repetition factor-dependent solution of multiplexing or bundling is in use.

Figure 10:
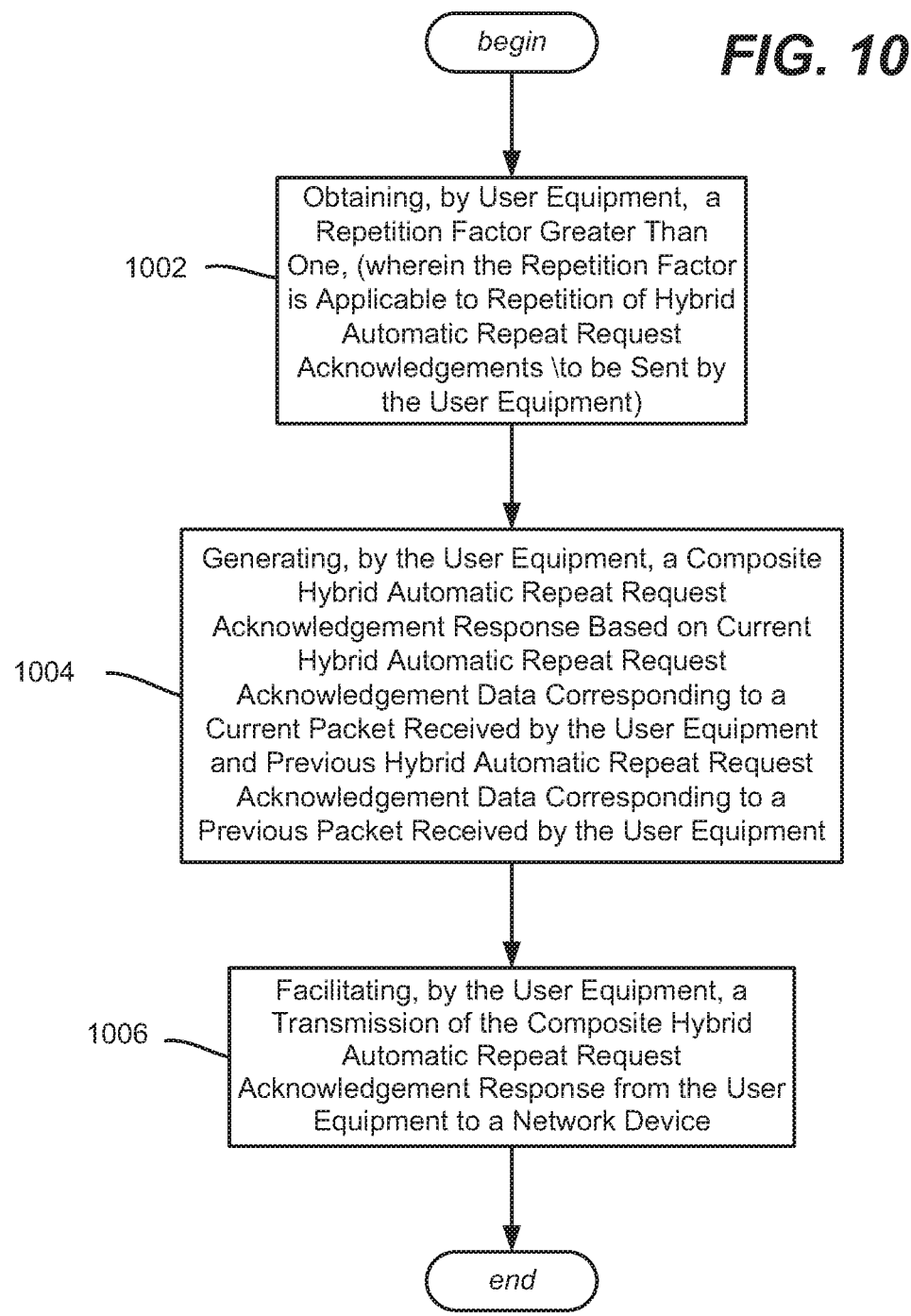
FIG. 10 illustrates an example flow diagram of aspects of user equipment operations, in accordance with various aspects and implementations of the subject disclosure.

One or more aspects, generally represented in FIG. 10, represent operations comprising (operation 1002) obtaining, by a user equipment comprising a processor, a repetition factor greater than one, wherein the repetition factor is applicable to repetition of hybrid automatic repeat request acknowledgements to be sent by the user equipment. Operation 1004 represents generating, by the user equipment, a composite hybrid automatic repeat request acknowledgement response based on current hybrid automatic repeat request acknowledgement data corresponding to a current packet received by the user equipment and previous hybrid automatic repeat request acknowledgement data corresponding to a previous packet received by the user equipment. Operation 1006 represents facilitating, by the user equipment, a transmission of the composite hybrid automatic repeat request acknowledgement response from the user equipment to a network device.

Obtaining the repetition factor may comprise determining, by the user equipment, the repetition factor. Another operation may comprise facilitating, by the user equipment, a communication of information representative of the repetition factor to the network device. Obtaining the repetition factor may comprise receiving the repetition factor from the network device.

An operation may comprise selecting, by the user equipment, the previous hybrid automatic repeat request acknowledgement data based on the repetition factor. Generating the composite hybrid automatic repeat request acknowledgement response may comprise multiplexing the current hybrid automatic repeat request acknowledgement data with the previous hybrid automatic repeat request acknowledgement data. Generating the composite hybrid automatic repeat request acknowledgement response may comprise bundling the current hybrid automatic repeat request acknowledgement data with the previous hybrid automatic repeat request acknowledgement data.

One or more operations may include determining, based on a criterion by the user equipment, whether generating the composite hybrid automatic repeat request acknowledgement response may comprise multiplexing the current hybrid automatic repeat request acknowledgement data with the previous hybrid automatic repeat request acknowledgement data, or bundling the current hybrid automatic repeat request acknowledgement data with the previous hybrid automatic repeat request acknowledgement data.

If the repetition factor is two, generating the composite hybrid automatic repeat request acknowledgement response may comprise generating the current hybrid automatic repeat request acknowledgement data with the previous hybrid automatic repeat request acknowledgement data, and wherein the previous hybrid automatic repeat request acknowledgement data comprises a most recent hybrid automatic repeat request acknowledgement dataset. If the repetition factor is three, generating the composite hybrid automatic repeat request acknowledgement response may comprise generating the current hybrid automatic repeat request acknowledgement data with a previous hybrid automatic repeat request acknowledgement data, and wherein the previous hybrid automatic repeat request acknowledgement data may comprise a most recent hybrid automatic repeat request acknowledgement dataset and a next most recent hybrid automatic repeat request acknowledgement dataset after the most recent hybrid automatic repeat request acknowledgement dataset. If the repetition factor is four, generating the composite hybrid automatic repeat request acknowledgement response may comprise generating the current hybrid automatic repeat request acknowledgement data with three most recent previous hybrid automatic repeat request acknowledgement datasets.

Generating the composite hybrid automatic repeat request acknowledgement response may comprise multiplexing the current hybrid automatic repeat request acknowledgement data with the previous hybrid automatic repeat request acknowledgement data, and wherein the transmission of the composite hybrid automatic repeat request acknowledgement response may enable the network device to demultiplex the composite hybrid automatic repeat request acknowledgement response into hybrid automatic repeat request acknowledgement datasets respectively corresponding to different packets to be transmitted by the network device to the user equipment.

Figure 11:
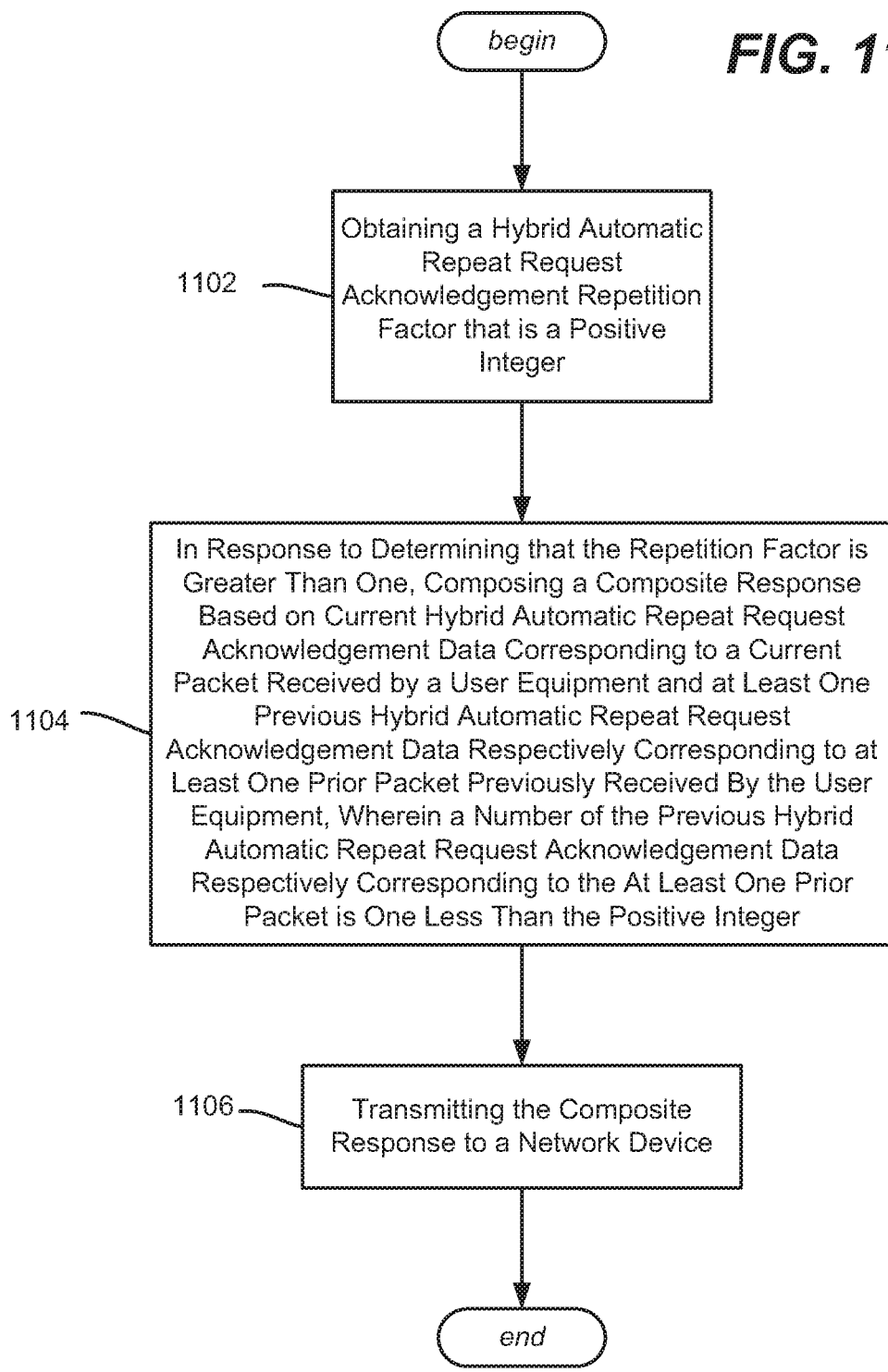
FIG. 11 illustrates an example flow diagram of aspects of user equipment operations, in accordance with various aspects and implementations of the subject disclosure.

One or more aspects are directed towards operations represented in FIG. 11, e.g., executed via a user equipment processor based on a memory that stores executable instructions that, when executed by the processor, facilitate performance of the operations. The operation 1102 represents obtaining a hybrid automatic repeat request acknowledgement repetition factor that is a positive integer. Operation 1104 operates in response to determining that the repetition factor is greater than one, and is directed towards composing a composite response based on current hybrid automatic repeat request acknowledgement data corresponding to a current packet received by a user equipment and at least one previous hybrid automatic repeat request acknowledgement data respectively corresponding to at least one prior packet previously received by the user equipment, wherein a number of the previous hybrid automatic repeat request acknowledgement data respectively corresponding to the at least one prior packet is one less than the positive integer. Operation 1106 represents transmitting the composite response to a network device.

Composing the composite response may comprise multiplexing the current hybrid automatic repeat request acknowledgement data with the previous hybrid automatic repeat request acknowledgement data. Composing the composite response may comprise bundling the current hybrid automatic repeat request acknowledgement data with the previous hybrid automatic repeat request acknowledgement data. Other operations may comprise, determining, based on a criterion, whether to perform the composing of the composite response by multiplexing the current hybrid automatic repeat request acknowledgement data with the previous hybrid automatic repeat request acknowledgement data, or by bundling the current hybrid automatic repeat request acknowledgement data with the previous hybrid automatic repeat request acknowledgement data.

Figure 12:
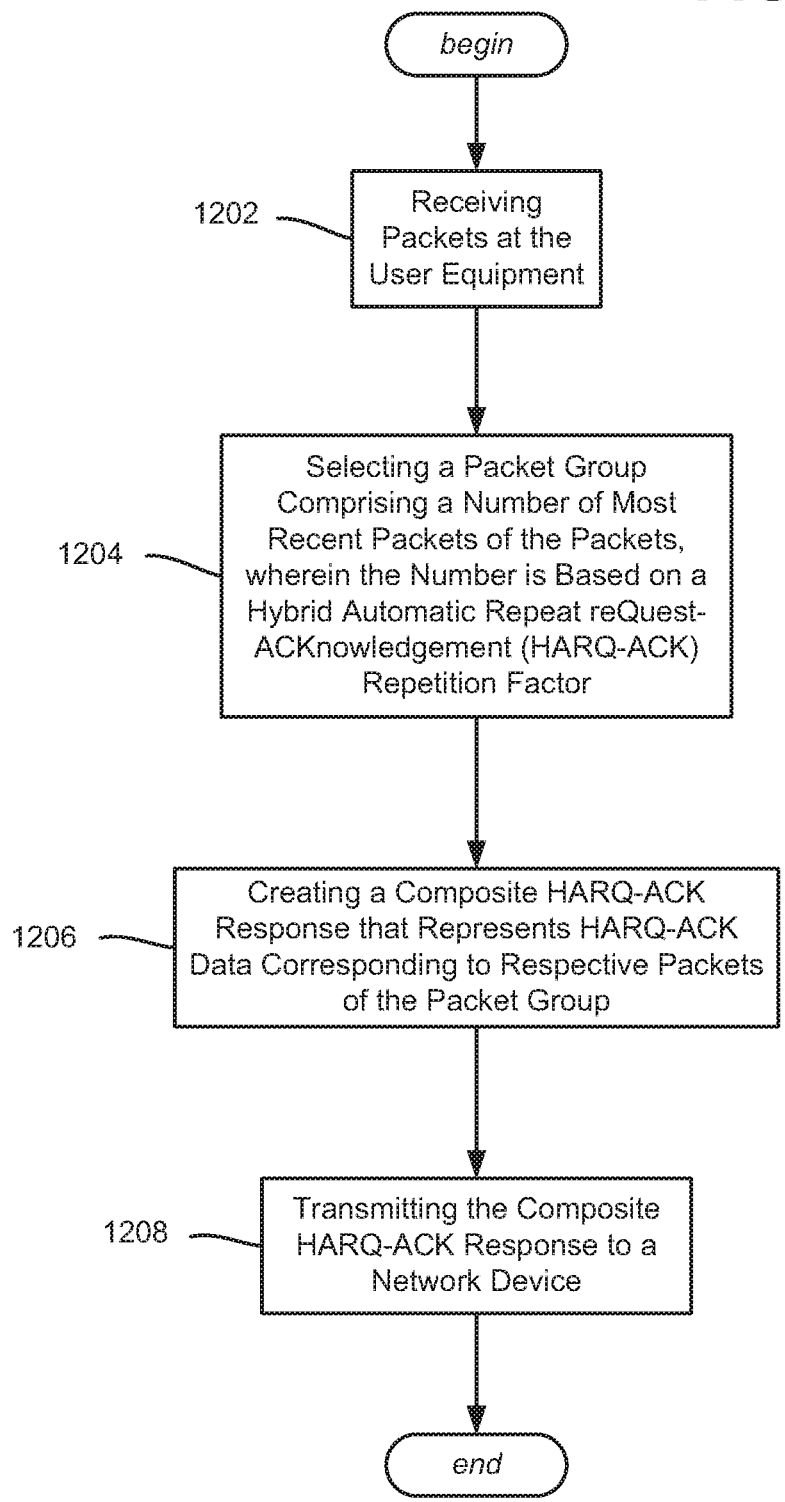
FIG. 12 illustrates an example flow diagram of aspects of user equipment operations, in accordance with various aspects and implementations of the subject disclosure.

FIG. 12 represents user equipment-related operations, including operation 1202, which represents receiving packets at the user equipment, an operation 1204, which represents selecting a packet group comprising a number of most recent packets of the packets, wherein the number is based on a Hybrid Automatic Repeat reQuest-ACKnowledgement (HARQ-ACK) repetition factor. Operation 1206 represents creating a composite HARQ-ACK response that represents HARQ-ACK data corresponding to respective packets of the packet group. Operation 1208 represents transmitting the composite HARQ-ACK response to a network device.

Creating the composite HARQ-ACK response may comprise multiplexing the HARQ-ACK data for the respective packets of the packet group. Creating the composite HARQ-ACK response may comprise bundling the HARQ-ACK data for the respective packets of the packet group. Creating the composite HARQ-ACK response may comprise, in response to determining the HARQ-ACK repetition factor is two, bundling the HARQ-ACK data for two most recent packets, or in response to determining the HARQ-ACK repetition factor is greater than two, multiplexing the HARQ-ACK data for the respective packets of the packet group.

As can be seen, the new radio coverage may be improved as the HARQ-ACK is repeated over multiple time intervals, however the peak throughput remains same as the network can schedule the user equipment in consecutive time intervals.

Figure 13:
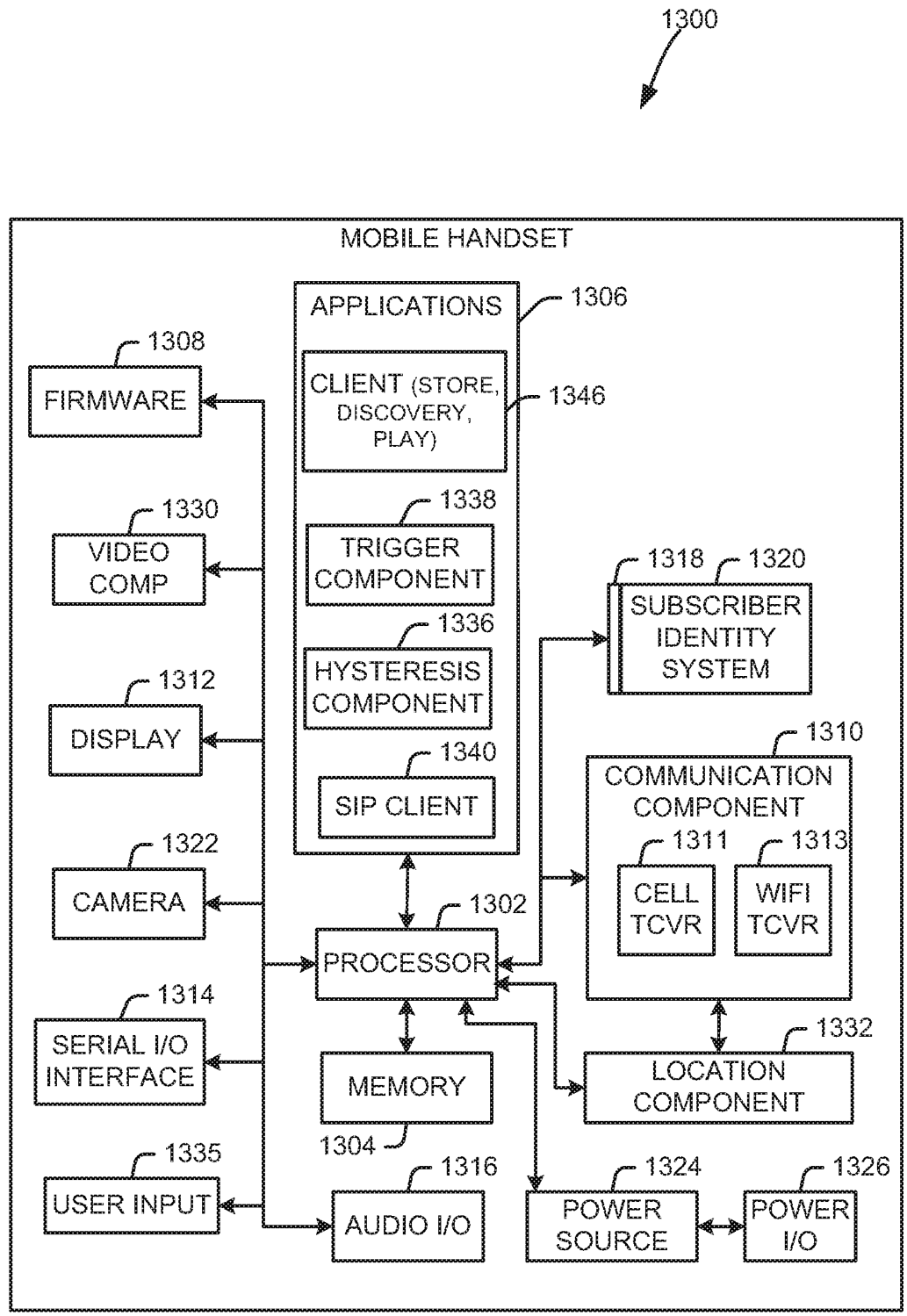
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
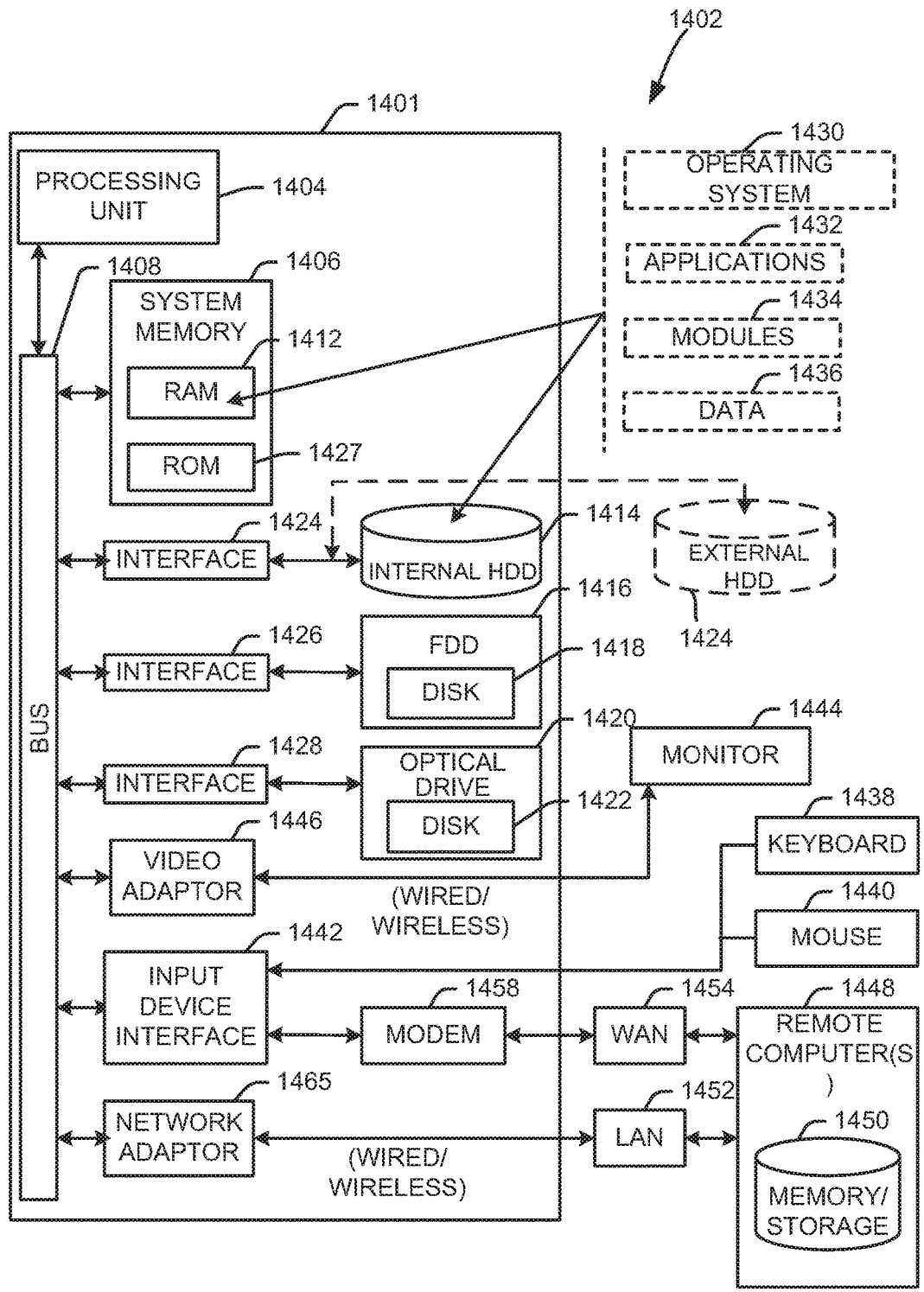
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1494), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, a mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    obtaining, by a user equipment comprising a processor, a repetition factor greater than one, wherein the repetition factor is applicable to repetition of hybrid automatic repeat request acknowledgements to be sent by the user equipment;
    selecting, by the user equipment, at least one previous hybrid automatic repeat request acknowledgement data based on the repetition factor;
    generating, by the user equipment, a composite hybrid automatic repeat request acknowledgement response based on current hybrid automatic repeat request acknowledgement data corresponding to a current packet received by the user equipment and the at least one previous hybrid automatic repeat request acknowledgement data corresponding to a previous packet received by the user equipment; and
    facilitating, by the user equipment, a transmission of the composite hybrid automatic repeat request acknowledgement response from the user equipment to a network device.

2. The method of claim 1, wherein the obtaining the repetition factor comprises determining, by the user equipment, the repetition factor.

3. The method of claim 2, further comprising facilitating, by the user equipment, a communication of information representative of the repetition factor to the network device.

4. The method of claim 1, wherein the obtaining the repetition factor comprises receiving the repetition factor from the network device.

5. The method of claim 1, wherein the generating the composite hybrid automatic repeat request acknowledgement response comprises multiplexing the current hybrid automatic repeat request acknowledgement data with the at least one previous hybrid automatic repeat request acknowledgement data.

6. The method of claim 1, wherein the generating the composite hybrid automatic repeat request acknowledgement response comprises bundling the current hybrid automatic repeat request acknowledgement data with the at least one previous hybrid automatic repeat request acknowledgement data.

7. The method of claim 1, further comprising, determining, based on a criterion by the user equipment, whether the generating the composite hybrid automatic repeat request acknowledgement response comprises multiplexing the current hybrid automatic repeat request acknowledgement data with the at least one previous hybrid automatic repeat request acknowledgement data, or bundling the current hybrid automatic repeat request acknowledgement data with the at least one previous hybrid automatic repeat request acknowledgement data.

8. The method of claim 1, wherein the repetition factor is two, wherein the generating the composite hybrid automatic repeat request acknowledgement response comprises multiplexing or bundling the current hybrid automatic repeat request acknowledgement data with the at least one previous hybrid automatic repeat request acknowledgement data, and wherein the at least one previous hybrid automatic repeat request acknowledgement data comprises a most recent hybrid automatic repeat request acknowledgement dataset.

9. The method of claim 1, wherein the repetition factor is three, wherein the generating the composite hybrid automatic repeat request acknowledgement response comprises multiplexing or bundling the current hybrid automatic repeat request acknowledgement data with the at least one previous hybrid automatic repeat request acknowledgement data, and wherein the at least one previous hybrid automatic repeat request acknowledgement data comprises a most recent hybrid automatic repeat request acknowledgement dataset and a next most recent hybrid automatic repeat request acknowledgement dataset after the most recent hybrid automatic repeat request acknowledgement dataset.

10. The method of claim 1, wherein the repetition factor is four, and wherein the generating the composite hybrid automatic repeat request acknowledgement response comprises multiplexing or bundling the current hybrid automatic repeat request acknowledgement data with three most recent previous hybrid automatic repeat request acknowledgement datasets.

11. The method of claim 1, wherein the generating the composite hybrid automatic repeat request acknowledgement response comprises multiplexing the current hybrid automatic repeat request acknowledgement data with the at least one previous hybrid automatic repeat request acknowledgement data, and wherein the transmission of the composite hybrid automatic repeat request acknowledgement response enables the network device to demultiplex the composite hybrid automatic repeat request acknowledgement response into hybrid automatic repeat request acknowledgement datasets respectively corresponding to different packets to be transmitted by the network device to the user equipment.

12. A system, comprising:
a processor; and
a memory that stores executable instructions that, when executed by the processor, facilitate performance of operations, the operations comprising:
obtaining a hybrid automatic repeat request acknowledgement repetition factor that is a positive integer;
in response to determining that the repetition factor is greater than one, composing a composite response based on current hybrid automatic repeat request acknowledgement data corresponding to a current packet received by a user equipment and at least one previous hybrid automatic repeat request acknowledgement data respectively corresponding to at least one prior packet previously received by the user equipment, wherein a number of the previous hybrid automatic repeat request acknowledgement data respectively corresponding to the at least one prior packet is one less than the positive integer; and
transmitting the composite response to a network device.

13. The system of claim 12, wherein the composing the composite response comprises multiplexing the current hybrid automatic repeat request acknowledgement data with the previous hybrid automatic repeat request acknowledgement data.

14. The system of claim 12, wherein the composing the composite response comprises bundling the current hybrid automatic repeat request acknowledgement data with the previous hybrid automatic repeat request acknowledgement data.

15. The system of claim 12, wherein the operations further comprise, determining, based on a criterion, whether to perform the composing the composite response by multiplexing the current hybrid automatic repeat request acknowledgement data with the previous hybrid automatic repeat request acknowledgement data, or by bundling the current hybrid automatic repeat request acknowledgement data with the previous hybrid automatic repeat request acknowledgement data.

16. The system of claim 12, wherein the obtaining the hybrid automatic repeat request acknowledgement repetition factor comprises receiving the hybrid automatic repeat request acknowledgement repetition factor from the network device.

17. A non-transitory machine-readable storage medium, comprising executable instructions that, when executed by a processor of a user equipment, facilitate performance of operations, the operations comprising:
receiving packets at the user equipment;
selecting a packet group comprising a number of most recent packets of the packets, wherein the number is based on a Hybrid Automatic Repeat reQuest-ACKnowledgement (HARQ-ACK) repetition factor;
creating a composite HARQ-ACK response that represents HARQ-ACK data corresponding to respective packets of the packet group; and
transmitting the composite HARQ-ACK response to a network device.

18. The non-transitory machine-readable storage medium of claim 17, wherein the creating the composite HARQ-ACK response comprises multiplexing the HARQ-ACK data for the respective packets of the packet group.

19. The non-transitory machine-readable storage medium of claim 17, wherein the creating the composite HARQ-ACK response comprises bundling the HARQ-ACK data for the respective packets of the packet group.

20. The non-transitory machine-readable storage medium of claim 17, wherein the creating the composite HARQ-ACK response comprises, in response to determining the HARQ-ACK repetition factor is two, bundling the HARQ-ACK data for two most recent packets, or in response to determining the HARQ-ACK repetition factor is greater than two, multiplexing the HARQ-ACK data for the respective packets of the packet group.

* * * * *